Patented Jan. 23, 1923.

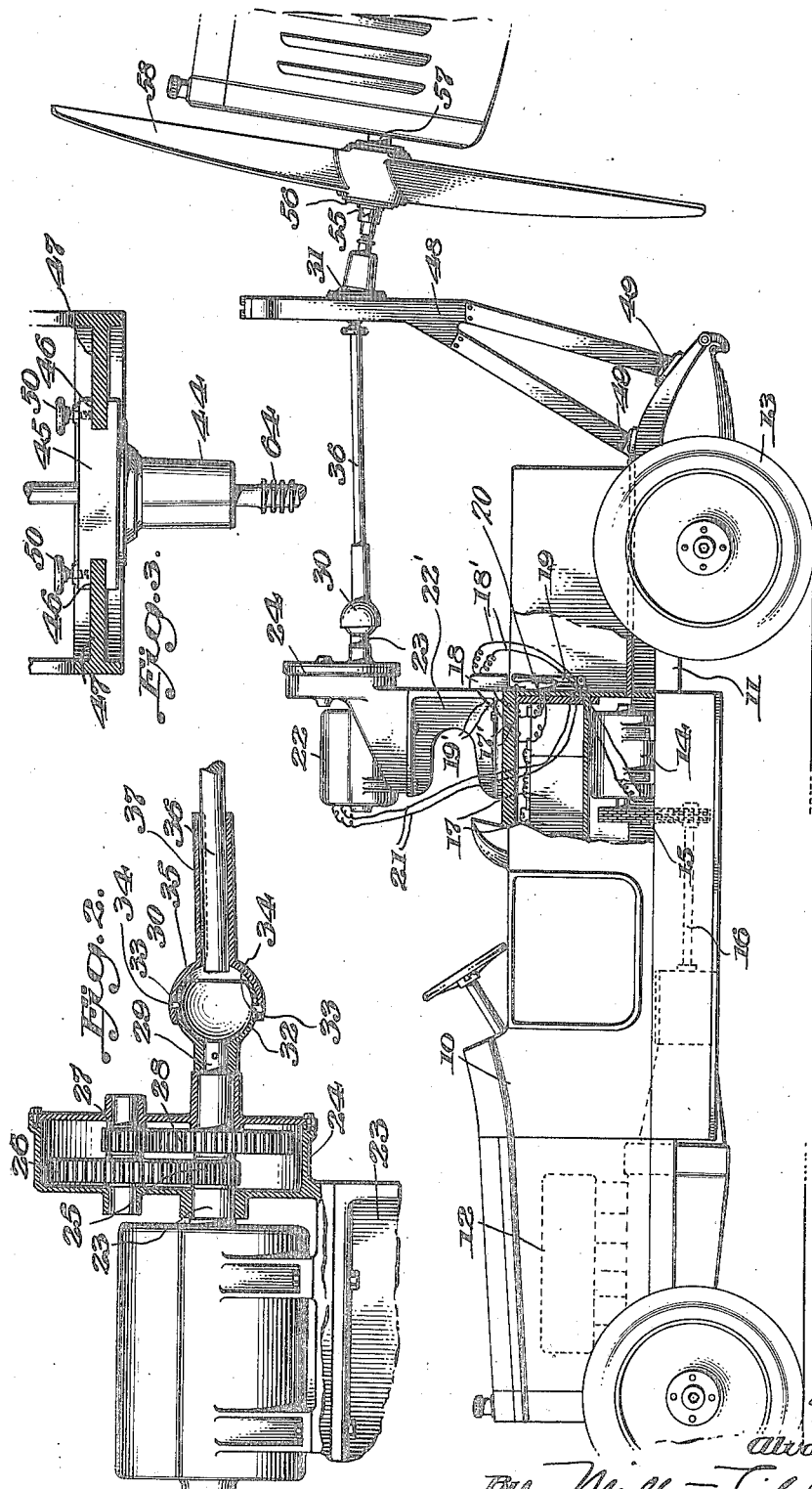

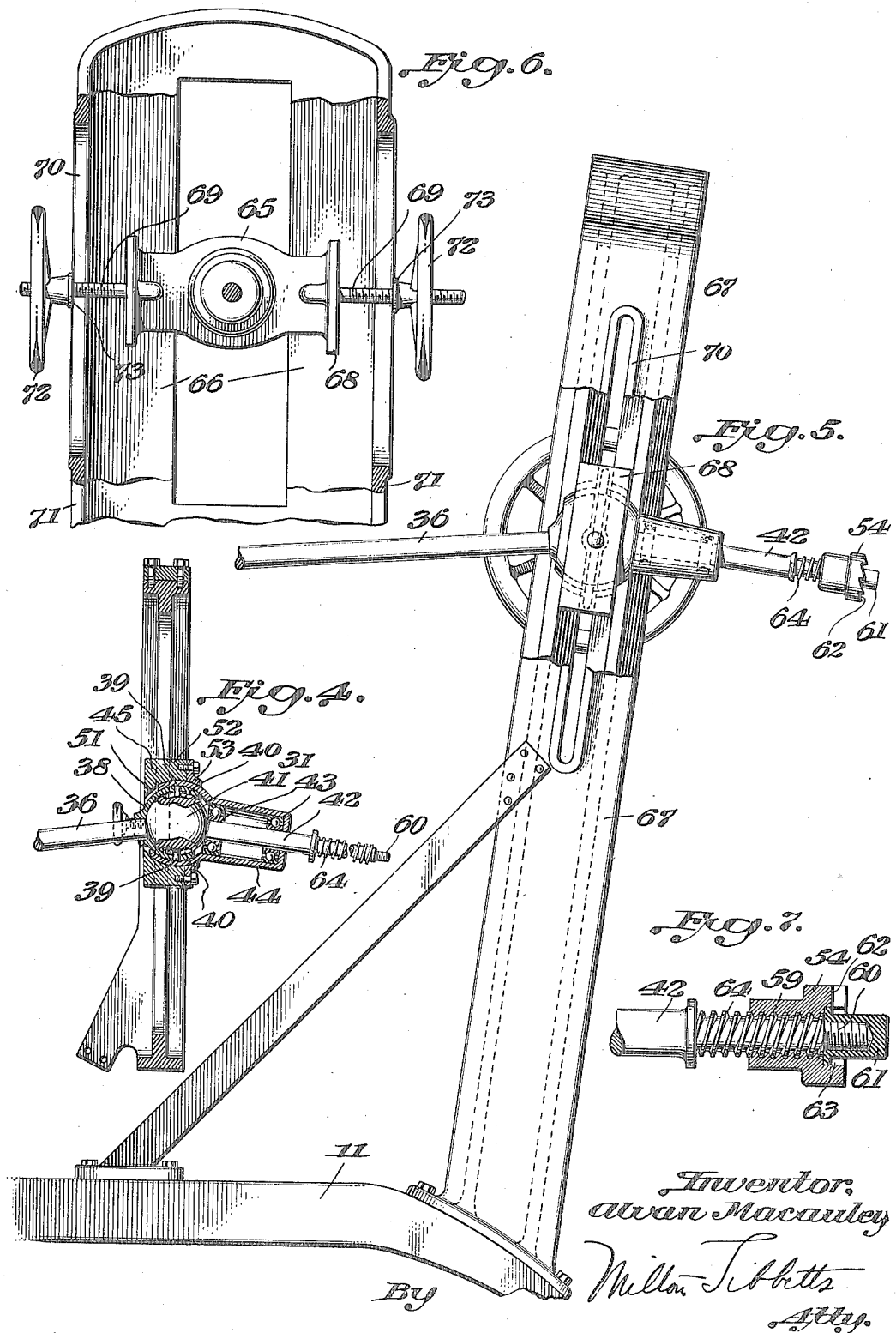

1,443,029

UNITED STATES PATENT OFFICE.

ALVAN MACAULEY, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 3, 1919. Serial No. 328,335.

*To all whom it may concern:*

Be it known that I, ALVAN MACAULEY, a citizen of the United States, and resident of Detroit, Wayne County, State of Michigan, have invented certain new and useful Improvements in Motor Vehicles, of which the following is a specification.

This invention relates to motor vehicles and more particularly to starting mechanism therefor.

It is well known that the starting of an airplane or aircraft motor by manually turning over the propeller is a strenuous and more or less dangerous task.

The present invention has for its object to provide means, preferably portable, for starting airplane or aircraft engines by power derived from a second engine or motor.

Another object is to provide aircraft starting mechanism having suitable adjustments whereby the mechanism may be adapted for use in connection with different types and sizes of airplanes or aircraft.

Another object is to provide a starting mechanism which may be easily and quickly placed in operative position with respect to the aircraft motor to be started.

Another object is to provide a construction in which the power utilized for starting the aircraft engine may be constantly replenished while the starting mechanism is operating.

Another object is to provide in connection with aircraft motor starting mechanism suitable clutch mechanism between the engine or propeller shaft of the aircraft motor and the starting motor, whereby the aircraft engine shaft may rotate independently of the starting shaft after the aircraft engine has been started.

Still further objects will appear as the description proceeds.

With the above objects in view, the invention comprises briefly a starting unit, which is mounted in this instance on a motor car, the starting unit having a motor to which is connected a power transmission shaft. In the embodiments of the invention illustrated, the power transmission shaft is shown as flexible and means is provided for supporting this shaft in various positions of vertical adjustment. The shaft is adapted to be connected with the engine shaft of the aircraft through suitable clutch mechanism so constructed and arranged that the propeller shaft can rotate freely after the aircraft engine has been started. Means such as an electric motor may be utilized as the starting motor, this motor being driven by power derived from the engine of the motor car upon which it is supported.

Certain specific embodiments of the invention have been illustrated in the accompanying drawings and in these drawings:

Fig. 1 is a view, in side elevation, partly broken away, illustrating my improved starting unit;

Fig. 2 is an enlarged view, in side elevation, partly in section, illustrating the motor and power transmission mechanism;

Fig. 3 is a horizontal sectional view illustrating the clamping means for adjustably supporting the power transmission shaft shown in Fig. 1;

Fig. 4 is a vertical sectional view of the construction shown in Fig. 3;

Fig. 5 is an enlarged view, in side elevation, partly broken away, illustrating another form of clamping means for adjustably supporting the power transmission shaft;

Fig. 6 is an end elevation of the construction shown in Fig. 5;—and

Fig. 7 is an enlarged detail view illustrating the connection between one member of the clutch mechanism hereinafter described and the power transmission shaft.

As illustrated in the drawings, my improved starting unit is mounted upon a motor propelled vehicle or car 10, having the usual frame 11 and engine 12, the latter being connected in any suitable manner to the wheels 13 of the car for propelling the vehicle.

I have shown in the present instance a generator 14 supported on the frame of the vehicle and connected in any suitable manner as by a chain 15 and power transmitting shaft 16 to the engine 12 of the motor vehicle. These connections are preferably so made that the generator is driven whenever the engine 12 is operated. A plurality of storage batteries 17 is supported on the vehicle, these batteries being connected by wires 17′ to an automatic control box 18 and from box 18 through wires 18′ to the generator 14. The control box is so constructed as to automatically disconnect the battery from the generator when the battery has been charged. The current from the storage batteries is transmitted through a switch 19 to an electric motor carried by the vehicle frame, wires 20 leading from the battery to the switch and wires 21 leading from the switch to the motor 22, the latter being supported on suitable framework 22', carried by the vehicle.

A motor shaft 23 is connected through suitable gearing to the power transmission shaft, this gearing being supported in a casing 24 (see Fig. 2) and comprising a plurality of gears 25, 26, 27 and 28, the latter gear being carried by a shaft 29 suitably journaled in the casing 24. The power transmitting mechanism between the shaft 29 and the propeller shaft includes a plurality of universal joints 30, 31 and suitable means, hereinafter described, is provided for supporting the power transmission shaft. The universal joints 30, 31 may be of any suitable construction, those illustrated in the drawing comprising a spherical member 32 which is secured to the shaft 29, this member having slots 33 into which extend pins 34 carried by a spherical member 35 which is slidably secured to a shaft 36 as shown at 37. The universal joint 31 is similar to that just described and comprises a member 38 secured to the opposite end of the shaft 36 from the member 35. The member 38 is provided with inwardly projecting pins 39 which extend into grooves 40 formed in the spherical member 41, which in turn is secured to a shaft 42. This latter shaft is mounted in ball bearings 43 carried by a casing 44 which partly surrounds the member 38 above described.

Suitable means is provided for adjustably supporting the power transmission shafting and in the embodiments of the invention illustrated this supporting means engages the universal joint interposed between the shafts 36 and 42. As shown in Figures 1 to 4 inclusive, this supporting means comprises a vertically adjustable block 45 (see Fig. 3) having a pair of longitudinal channels 46 formed therein. These channels are positioned on longitudinal inwardly extending ribs 47, carried by a supporting bracket 48 which in turn is rigidly secured at its lower end as shown at 49 to the rear end of the frame 11 of the vehicle. From this description, it will be seen that the block 45 is slidably mounted or vertically adjustable in a longitudinal slot formed between the vertical ribs 47 and suitable means is provided for clamping the block 45 in any desired position of vertical adjustment in this slot. The clamping means illustrated in Fig. 3 comprises a pair of hand screws 50 which extend through the side portions of the block 45 and are adapted to engage the ribs 47 above described.

The block 45 is provided with a spherical opening 51 in which is positioned the casing 44 above described, this casing supporting the cooperating members of the universal joint as clearly illustrated in Fig. 4. If desired, the block may be formed in two parts in order that the parts may be more easily assembled, these two parts consisting of a main or body portion 52 and a cap 53 as shown in Fig. 4.

In order to permit the free rotation of the propeller shaft after the aircraft engine has been started suitable clutch mechanism is provided between the power transmission mechanism and the engine shaft, this clutch mechanism comprising a clutch member 54 carried by the shaft 42 and a clutch member 55 carried by the hub 56 of the propeller shaft 57, a propeller 58 of any suitable construction being carried by this hub. In order to properly position these two clutch members the member 54 is adjustably carried by the shaft 42 being connected thereto by a screw threaded connection as shown at 59. The extreme end of the shaft 42 is reduced in section as shown at 60, a centering member 61 having screw threaded engagement with the reduced portion 60. The member 61 is provided adjacent its rear end with an annular flange 62, which is adapted to engage the inner wall of a recess 63 formed in the clutch member 54. The member 54, therefore, is first placed in position on the screw threaded portion 64 of the shaft 42, after which the centering member 61 is positioned on the portion 60 of the shaft. When the clutch member 54 is properly positioned to engage the clutch member 55 of the propeller shaft, the member 54 may be secured in this position by rotating the centering member 61. It will be understood that the member 61 extends into a suitable recess formed in the hub of the propeller for the purpose of centering the clutch members.

Another embodiment of the adjustable clamping means for the power transmission mechanism is illustrated in Figures 5 and 6 and this means comprises a vertically adjustable block 65 which is adjustably supported between two pairs of vertically extending ribs 66, carried by the supporting bracket 67, which in turn is secured at its lower end to the frame 11 of the vehicle. The block 65 supports the universal joint formed between the shaft 36 and the shaft 42 in a manner exactly similar to that just described in connection with the construction shown in Figures 1 and 4 and, therefore, a detailed description of this feature of the construction is not deemed necessary. The block 65 is provided at its opposite ends with transverse vertically extending guiding portions 68, these portions being positioned between the vertical ribs 66 above described. A pair of oppositely extending screw threaded members 69 extend outwardly from the side edges of the ends of the plug 65, these members passing through vertical slots 70 formed in the sides 71 on the bracket 67 and hand wheels 72 engage the screw threaded members 69 and are provided with hubs 73 which are adapted to engage the edges of the slots 70 and thereby retain the block 65 in any desired position of vertical adjustment.

A brief description of the operation of the above described starting mechanism will now be given:

The motor vehicle 10 will first be propelled under its own power to a position adjacent the engine shaft of the aircraft engine and after the vehicle with the power unit thereon has been so positioned, the power transmission shaft will be vertically adjusted on the bracket carried by the frame to a position in which the clutch member 54 of the power transmission shaft is located in operative position with respect to the clutch member 55 carried by the aircraft engine shaft or the hub of the propeller. These members having been so positioned, the switch 18 will be thrown into closed position whereupon the motor 22 will be started and power will be transmitted through the power transmission mechanism to the engine shaft of the aircraft engine. When this latter shaft has been started, free rotation thereof is permitted by the clutch mechanism 54, 55 above described. It will be understood that the generator 14 can be driven while the starting operation of the aircraft engine is in progress thereby securing a constant power supply and preventing any loss of time or interruption in the operation of the improved starting mechanism.

While certain specific embodiments of the invention have been described in the above specification it should be understood that further changes and modifications in the construction and arrangement of the cooperating parts may be made without departing from the spirit and scope of the invention as expressed in the following claims.

What I claim and desire to secure by Letters Patent is:

1. Starting mechanism for aircraft engines, comprising in combination a portable unit, having a motor thereon, a supporting member carried by said unit, a flexible power transmission shaft operatively connected to said motor and including a plurality of universal joints and means cooperating with one of said joints for supporting said power transmission shaft in a plurality of positions of vertical adjustment on said supporting member.

2. Starting mechanism for aircraft engines, comprising in combination a portable unit having a motor thereon, a supporting bracket carried by said unit, a block vertically adjustable on said supporting bracket and a power transmission shaft operatively connected to said motor and supported in said block.

3. Starting mechanism for aircraft engines, comprising in combination a portable unit having a motor thereon, a supporting bracket carried by said unit, a block adjustably supported in said bracket, means for securing said block in a plurality of positions of vertical adjustment, a power transmission shaft having a plurality of universal joints therein one of said joints being supported in said block.

In testimony whereof I affix my signature.

ALVAN MACAULEY.